United States Patent [19]

Okada et al.

[11] Patent Number: 4,613,753
[45] Date of Patent: Sep. 23, 1986

[54] PHOTOELECTRIC CONVERTING APPARATUS FOR OPTICAL SCANNING SYSTEM

[75] Inventors: Kunihiro Okada, Tokyo; Hirohide Endo, Tokorozawa; Susumu Saito, Hachioji, all of Japan

[73] Assignees: Hitachi, Ltd.; Hitachi Koki Company, Ltd., both of Tokyo, Japan

[21] Appl. No.: 421,378

[22] Filed: Sep. 22, 1982

[30] Foreign Application Priority Data

Sep. 24, 1981 [JP] Japan .................................. 56-149460

[51] Int. Cl.⁴ ............................................... H01J 3/14
[52] U.S. Cl. ...................................... 250/236; 350/6.7; 358/293
[58] Field of Search .............. 250/234, 235, 236, 578; 358/285, 293, 294, 296, 302, 213, 199, 206, 208; 356/446; 350/6.5–6.91

[56] References Cited

U.S. PATENT DOCUMENTS

| | | | |
|---|---|---|---|
| 2,262,584 | 11/1941 | Herriott | ................. 358/293 |
| 2,962,549 | 11/1960 | Pricks | ................. 358/293 X |
| 3,603,730 | 9/1971 | Weigl | . |
| 4,065,788 | 12/1977 | Meier et al. | ................. 358/213 X |
| 4,272,684 | 6/1981 | Seachman | ................. 358/213 |
| 4,518,864 | 5/1985 | Inuiya | ................. 250/578 |

FOREIGN PATENT DOCUMENTS 3118458 11/1982 Fed. Rep. of Germany .

Primary Examiner—Edward P. Westin
Attorney, Agent, or Firm—Antonelli, Terry & Wands

[57] ABSTRACT

The present invention discloses a photoelectric converting apparatus which comprises a spot-like light beam generating source, an optical system scanning the light beam linearly on a scanned surface, and light receivers having a long piece along the direction of the scanned line and disposed close to the scanned surface in order to receive the reflected light from the scanned surface and generate an electric signal corresponding to the intensity of received light.

3 Claims, 8 Drawing Figures

PHOTOELECTRIC CONVERTING APPARATUS FOR OPTICAL SCANNING SYSTEM

BACKGROUND OF THE INVENTION

This invention relates to a photoelectric converting apparatus used in a character recognition apparatus, etc.

A photoelectric converting apparatus by a flying spot scanner using an electron beam, etc. is known and currently in use. In such an apparatus, the beam is focused on a scanned surface by a focusing lens. The reflected light is received by a photomultiplier and the intensity of the reflected light is converted into an electric signal. It is necessary to accommodate the scanned surface and the photomultiplier in a black box in order to obtain a good S/N ratio. It is necessary, further, that a plurality of photomultipliers are provided at a distance from the scanned surface in order to receive the reflected light from the scanned surface uniformly. As a result, the utility efficiency of light is decreased and a problem of scale-up of the photoelectric converting apparatus arises.

SUMMARY OF THE INVENTION

The object of the present invention is to provide a photoelectric converting apparatus with a large utility factor of light, a small size, a high speed and high resolution performance, and little irregularity in the receipt of reflected light. In order to attain the object, the invention has the following characteristic of constitution. Namely, an optical detector with a long piece in the direction perpendicular to the moving direction of the scanned surface is mounted in the vicinity of the scanned surface so that a spot-like light beam may scan the surface along this long piece. The light reflected from the scanned surface is received by the optical detector and an electric signal corresponding to the intensity of the received light is generated.

DESCRIPTION OF THE PREFERRED EMBODIMENTS

Figure 1:
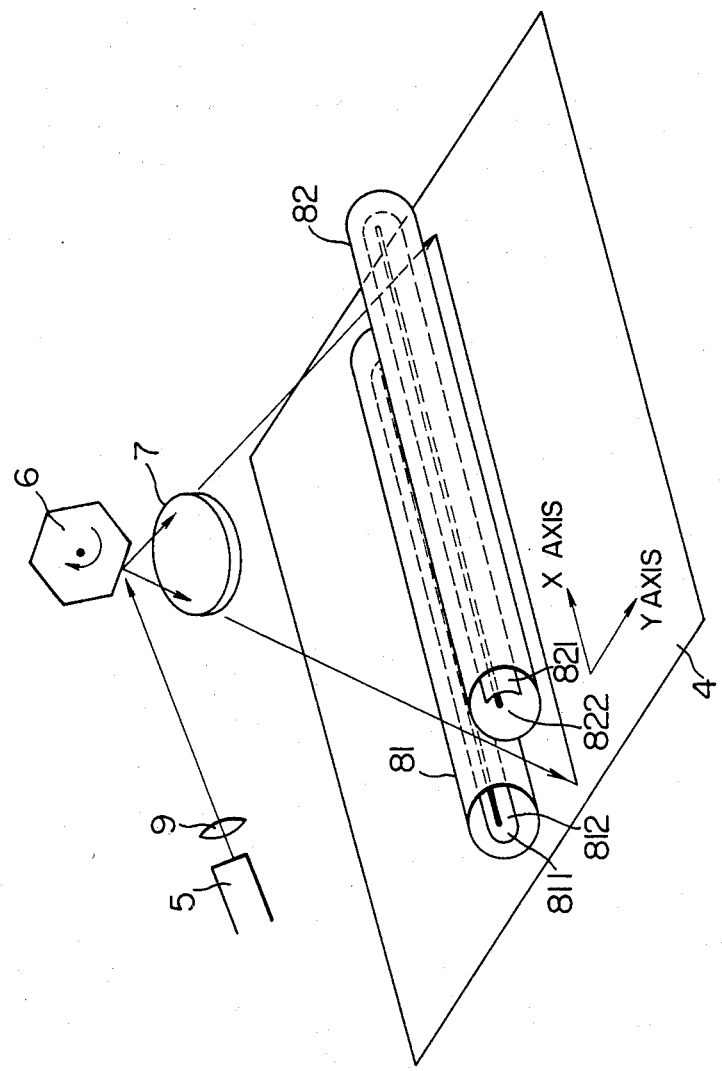
FIG. 1 is a diagram showing the constitution of one embodiment of a photoelectric converting apparatus according to this invention.

FIG. 1 shows the first embodiment of this invention. In this figure, an example is shown, in which a laser light source 5 is horizontally scanned by a rotating polyhedron mirror 6. However, it is needless to say that the same constitution may be used for the scanning by an electron beam.

In FIG. 1, the light emitted by the laser source 5 is focused by a focusing lens 9 to be irradiated on the rotating polyhedron mirror 6. The laser light reflected by the polyhedron mirror 6 is moved on a scanned surface 4 in the horizontal (x axis) direction. Since the scanned surface 4 is positioned on the chord of an arc scanned by the laser beam, an optical path difference appears. If this optical path difference is corrected by a correcting lens 7, the laser light can be irradiated on a horizontal position proportionally to the rotation angle of the rotating polyhedron mirror 6. For example, an FO lens may be used for the correcting lens 7. Photoelectric converters 81 and 82 convert the intensity of the reflected light into an electric signal.

Pairs of photoelectric converting surfaces and anodes, 811 and 812 and 821 and 822, of the photoelectric converters 81 and 82, respectively, are placed along the scanning direction (x axis) of the laser light. They are made opposite to the scanned surface 4 in order to receive the reflected light from the scanned surface efficiently. The lengths of the photoelectric converters 81 and 82 are made larger than the scanning width of the laser light in order to also receive the light at the scanning ends. Furthermore, these apparatus are mounted in the vicinity of the scanned surface 4 in a manner which does not disturb the movement of the surface. If the phototube with a photoelectric surface such as Sb-Cs is elongated, it can realize the photoelectric converters 81 and 82 simply. Converters 81 and 82 and the scanned surface 4 may be accommodated in a case which intercepts any external light, as the occasion demands.

Figure 2:
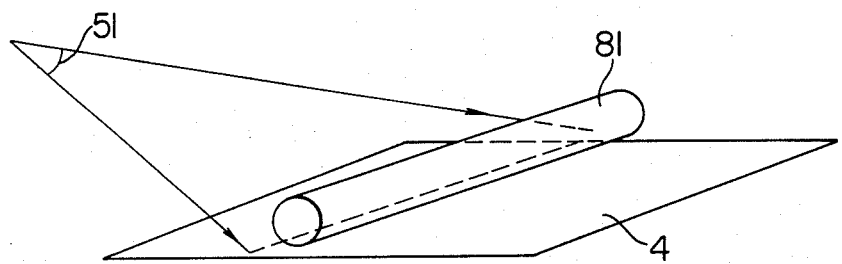
FIGS. 2 to 4 are diagrams showing other embodiments of an photoelectric converting apparatus according to this invention.

FIG. 2 shows the second embodiment of this invention. Although, in FIG. 1, the laser light is irradiated from the direction vertical to the scanned surface and the photoelectric converters 81 and 82 are mounted on both sides of the scanned line of the laser light, in this embodiment the laser light is irradiated from the slant direction and the photoelectric converter 81 is mounted oppositely to the scanned surface 4.

Figure 3:
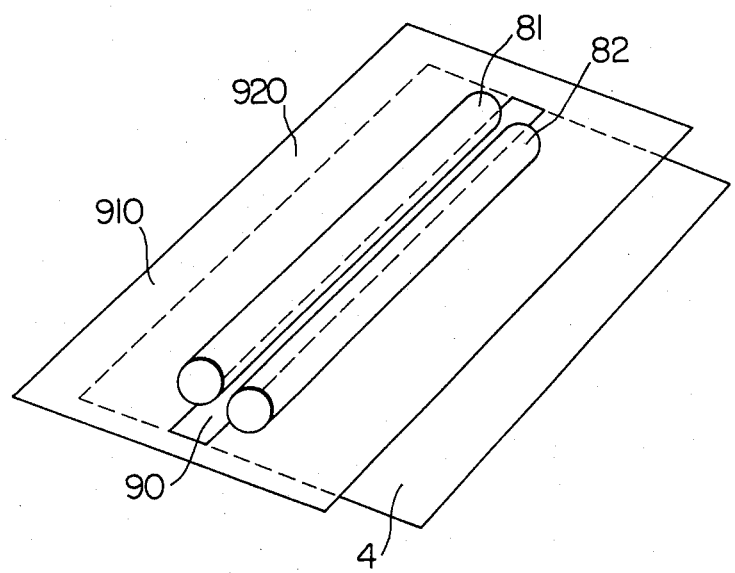

FIG. 3 is the third embodiment of this invention, in which the S/N ratio is further increased. Although in the prior art photoelectric converting apparatus the S/N ratio is deteriorated by the invasion of optical noise into the photoelectric converters 81 and 82, in the apparatus of this invention the S/N ratio is made extermely high, since the photoelectric converter is mounted in the proximity of the scanned surface and the photoelectric surface is directed to the scanned surface. However, if light other than from a point source is incident on a surface portion near the scanned region, the light reflected from this region is received by the photoelectric converter. This deteriorates the S/N ratio. The embodiment shown in FIG. 3 solves this problem in the following way. An optical shield board 910 with a slit 90 is placed in close contact with the scanned surface 4 in such a manner that it does not disturb the movement of the scanned surface 4. The optical shield board may be made of a material with a sufficiently low reflectivity, or its surface may be applied with a coating 920 with a low reflectivity.

Figure 4:
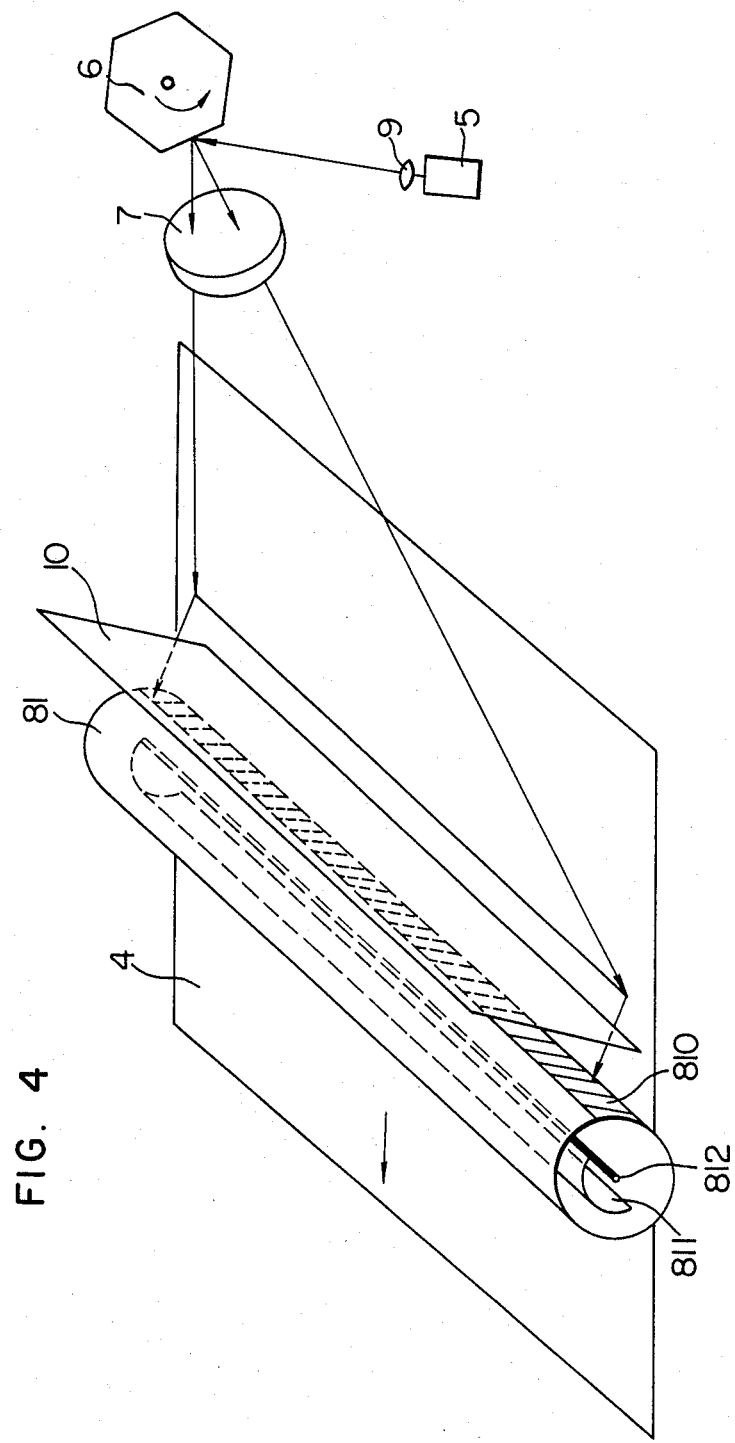
Figure 5A:
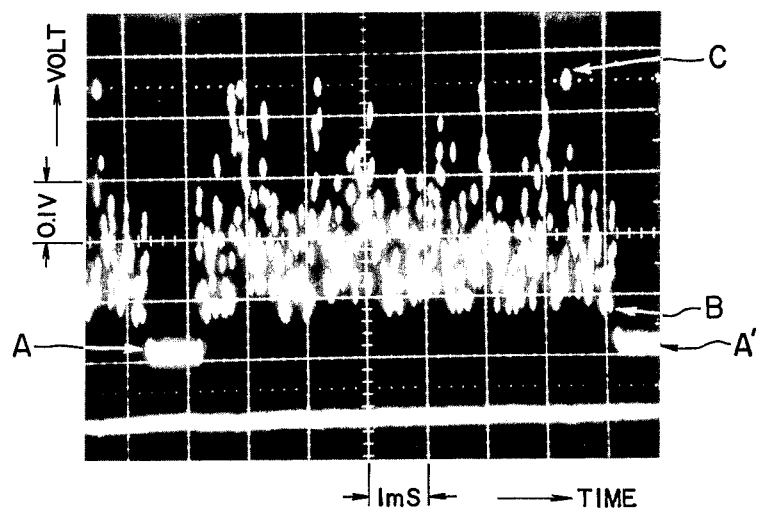
FIGS. 5a-5d are diagrams showing experimental results which clarify the effect of the photoelectric converting apparatus shown in FIG. 4.
Figure 5B:
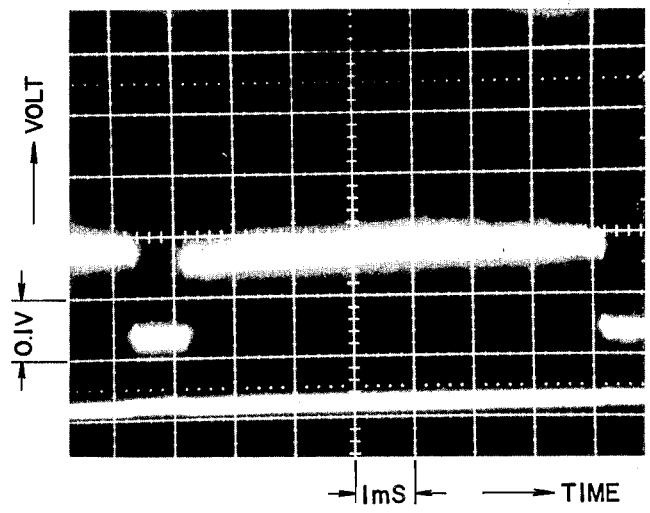
Figure 5C:
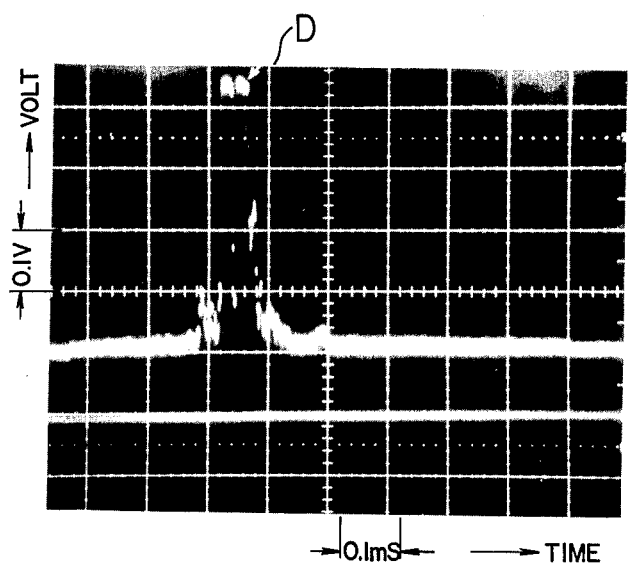
Figure 5D:
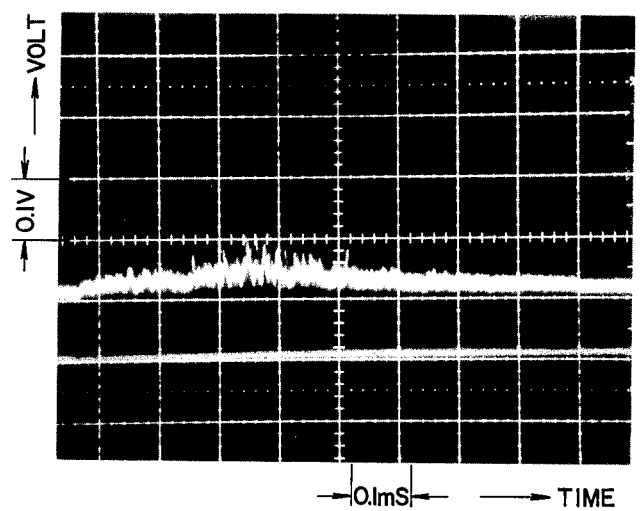

FIG. 4 shows the fourth embodiment of this invention, in which the problem of saturation of the photoelectric converter due to the normal reflection at the scanned surface is solved. The normal reflection means that the direction of the reflected light is limited within a constant angle because the scanned surface act as a mirror surface against the incident light due to a certain reason. Usually, if the scanned surface is paper, etc., the reflected light is scattered. However, a part of the paper drawn strongly with a pencil, etc., is filled with carbon and hence has a smoothness. This often increases normal reflections.

If normal reflections happen, the quantity of light incident on the photoelectric converter can reach a value some scores times larger than a usual value. This causes saturation of the photoelectric converter, inhibiting any accurate photoelectric conversion and also reducing the response speed. Furthermore, since the reflected light is focused on a particular part of the photoelectric converter, the problem of irregularity of local sensitivity of the photoelectric converter can easily occur.

Although FIG. 4 shows an example of a flying spot by a laser beam, it is needless to say that other methods of using e.g. an electron beam may be used.

In FIG. 4, the light beam emitted from a laser source 5 is changed to a parallel beam by a focussing lens 9, and then reflected by a rotating mirror 6. The beam is made incident on an FO lens 7, which is a correcting and focusing lens for obtaining a scanning beam with a uniform velocity in proportion to the rotation angle of the rotating mirror 6. The scanning beam having passed through the FO lens 7 is reflected by a scanned surface 4 and then passes through a scattering material 10 before it enters a photoelectric converter 81. The scattering material 10 is a medium for scattering the transmitted light. It is made of minute surfaces of transparent glass formed in such a manner the surfaces from which the light comes out are directed to various directions. Depending on the state of the scanned surface, it can happen that the light beam incident on a particular part of the photoelectric converter 81 becomes abnormally intense. Therefore, if the light scattering material 10 is inserted in the optical path of the reflected light toward the photoelectric converter 81, the direct light to the photoelectric converter 81 is thereby scattered. The scattering material 10 ensures uniform irradiation of light on the surface 811 of the photoelectric converter 81 through inlet windows 810. Thus, the local saturation of the photoelectric converting surface 811 can be prevented. In FIG. 4, the photoelectric converter 81 is e.g. a photoelectric cell. The photoelectric converting surface 811 is the cathode. The anode 812 is provided oppositely to the cathode. No problem will happen, even if the light scattering material 10 is formed as one united body at the inlet windows 810.

FIG. 5 shows experimental results showing the effect of the light scattering material 10. FIG. 5a shows intensity distribution of the reflected light when a laser beam is irradiated on the white field of fine quality. Depending on the state of the paper, there is an intensity difference of 4 to 5 times between B and C with respect the level AA'. This means that the saturation level C is reached in localized parts. FIG. 5b shows the case where the light scattering material 10 is inserted. It is seen that the intensity distribution of light is flattened. FIG. 5c shows the case of normal reflections by a black field. It is seen that, since abnormally intense light is reflected locally, the local saturation of the photoelectric converter appears at D. FIG. 5d shows the effect of inserting a light scattering material 10 in the case of FIG. 5c. It is seen that the distribution of light intensity is flattened.

Namely, with use of the light scattering material 10, the local saturation can be prevented and the irregularity of local sensitivity of the photoelectric converter is averaged. Therefore, an accurate photoelectric converting apparatus which responds to the light-and-shade of the scanned surface without any normal reflections can be realized. The light scattering material of the invention could also be used in combination with the light shielding board of the invention as disclosed in FIGS. 3 and discussed above.

As described above, according to this invention, since the photoelectric converter is placed in the neighborhood of the scanned surface, the utility efficiency of the reflected light is remarkably increased and the S/N ratio is enhanced. Furthermore, the output of the laser light may be reduced and the sensitivity of the phototube may be also decreased. This enables the design of miniaturization and the cost reduction of the apparatus. Therefore, the effect of this invention is large.

We claim:

1. A photoelectric converting apparatus comprising a means for generating a spot-like light beam, optical scanning means for focusing said light beam on a scanned surface and moving said beam linearly in a direction perpendicular to the moving direction of said scanned surface, and photoelectric converting means having a photoelectric converting surface with a long piece in the scanning direction, said photoelectric converting surface being made close to said scanned surface, said photoelectric converting means including a light scattering mens inserted between said scanned surface and said photoelectric converting surface to convert the light beam reflected from said scanned surface into scattered light, said scattering means flattening the distribution of light intensity of said reflected light, and said photoelectric converting means being mounted in such a manner as to receive said scattered light reflected from said scanned surface.

2. A photoelectric converting apparatus according to claim 1, wherein said photoelectric converting means comprise an optical shielding means for covering said scanned surface except at a linear part scanned by said light beam, with a material having a small optical reflectivity.

3. A photoelectric converting apparatus according to claim 1, wherein said light scattering means is placed so as to constitute light beam inlet windows for said photoelectric surface.

* * * * *